No. 724,283. PATENTED MAR. 31, 1903.
C. E. HANCOCK.
MOLDING APPARATUS.
APPLICATION FILED OCT. 25, 1902.

NO MODEL. 2 SHEETS—SHEET 1.

WITNESSES:
Harry C. Robb
Alfred T. Gage

INVENTOR
Charles E. Hancock
BY
E. B. Stocking
ATTORNEY

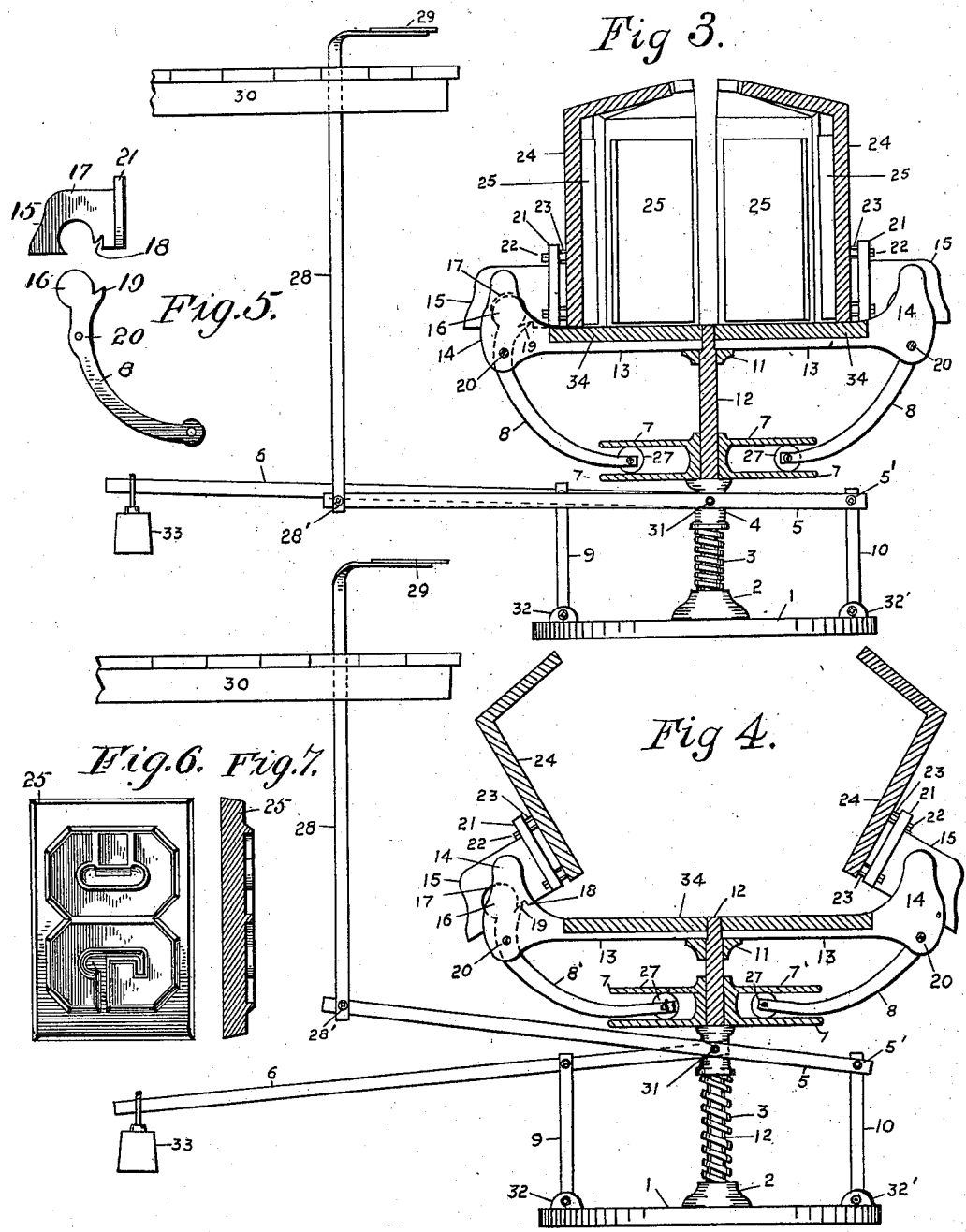

UNITED STATES PATENT OFFICE.

CHARLES E. HANCOCK, OF MARION, INDIANA, ASSIGNOR OF TWO-THIRDS TO JACOB M. BARNARD AND ALFRED C. BARNARD, OF MARION, INDIANA.

MOLDING APPARATUS.

SPECIFICATION forming part of Letters Patent No. 724,283, dated March 31, 1903.

Application filed October 25, 1902. Serial No. 128,809. (No model.)

*To all whom it may concern:*

Be it known that I, CHARLES E. HANCOCK, a citizen of the United States, residing at Marion, in the county of Grant, State of Indiana, have invented certain new and useful Improvements in Molding Apparatus, of which the following is a specification, reference being had therein to the accompanying drawings.

This invention relates to a molding apparatus, and particularly to a construction adapted to mold articles having an angle edge.

The invention has for its object to provide a construction whereby in the opening of the mold the members thereof are given a primary reciprocating movement and a subsequent oscillating or tilting movement, so as to clearly remove the die from the angle edge of the article molded and then tilt the members thereof sufficiently to permit the removal of the molded article.

A further object of the invention is to provide a novel construction of lever adapted to be automatically operated to reciprocate and oscillate the members of the mold when the pressure upon the closing means therefor is released.

A further object of the invention is to provide an improved construction of means for operating the opening and closing levers which control the movement of the sections of the mold.

Other and further objects and advantages of the invention will be hereinafter set forth and the novel features thereof defined by the appended claims.

Figure 1:
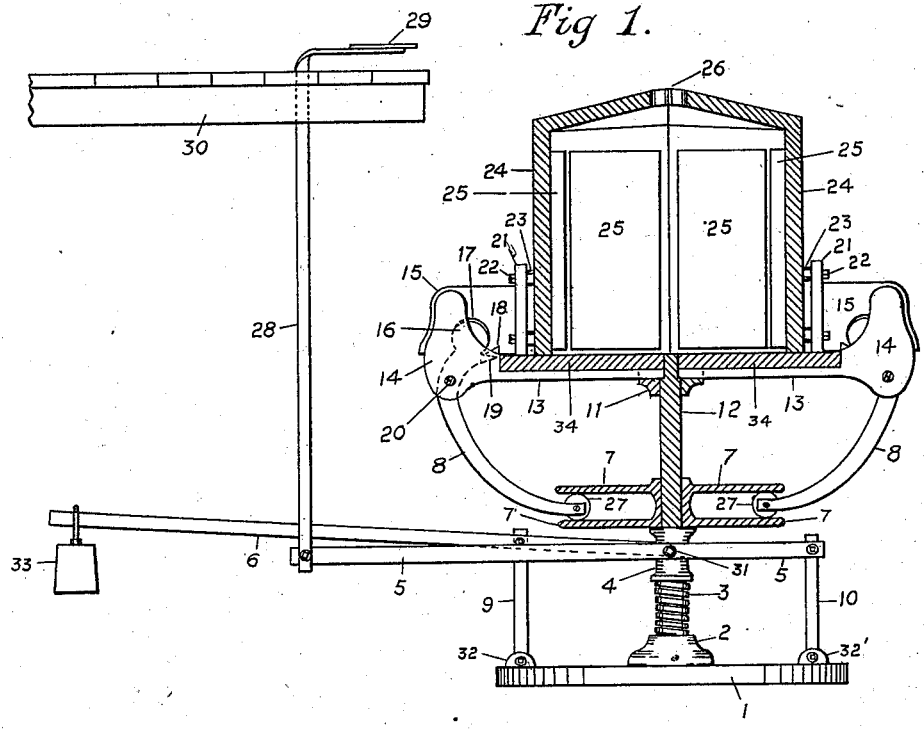
Figure 2:
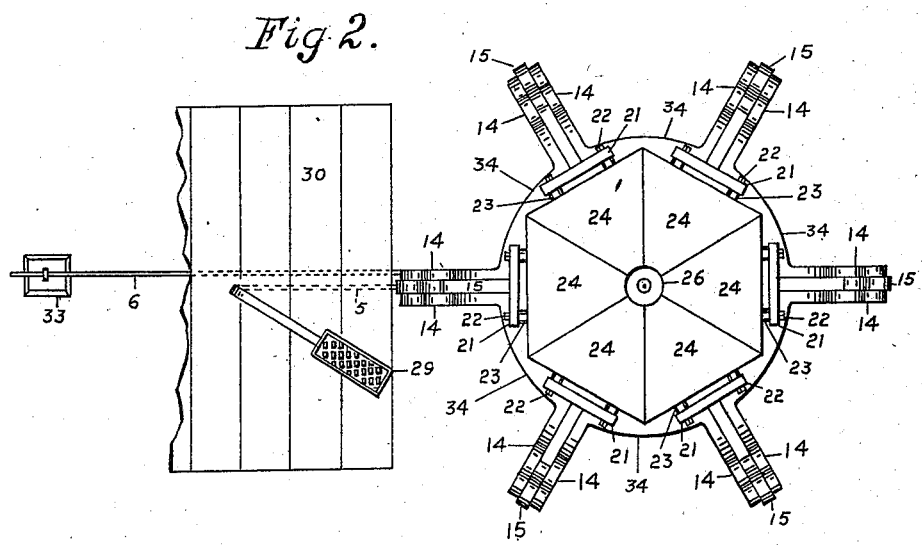

In the drawings, Figure 1 is a vertical section through the molding apparatus, showing the parts in a closed position; Fig. 2, a top plan thereof; Fig. 3, a vertical section through the invention, showing the sections of the mold partially opened; Fig. 4, a similar view showing the mold completely opened; Fig. 5, a detail elevation of the yoke and lever for operating the mold-sections; Fig. 6, an elevation of the die used in the mold, and Fig. 7 a vertical section thereof.

Like numerals indicate like parts in the several figures of the drawings.

The numeral 1 indicates a floor-plate upon which a base 2 is mounted, having secured therein a vertical standard 12, which carries at its upper end a plate 34, forming the bottom of the mold. Secured beneath this plate by means of a set-collar 11 are radially-extending ribs 13, carrying at their outer ends ears 14, between which the yokes 15, secured to the sections 24 of the mold, are adapted to operate. These yokes are provided with securing-plates 21 and held in position by means of bolts 22, passing through interposed lugs or collars 23, so as to leave an air-space between the plates and the mold to prevent undue heating of the parts and the consequent expansion thereof. Each of the sections 24 is herein illustrated as having secured thereto in any suitable manner a die-plate 25, containing the letter or object adapted to be molded from hollow blown-glass ware, said plates being shown in detail in Figs. 6 and 7 as adapted to form a sign-letter. The yokes are each provided with a curved socket 17 and a crotch or recess 18, adapted to coöperate, respectively, with a curved head 16 and a tooth 19, carried by the lever 8, which is pivoted between the ears 14 by means of the pin or bolt 20. The lower ends of these levers are disposed between a flanged plate 7, slidingly mounted upon the upright or standard 12, and may, if desired, be provided with friction-rollers 27, whereby the vertical movement of the plate transmits an oscillatory movement to the lower ends of the levers 8. For the purpose of reciprocating this flanged plate to operate the levers a sliding collar 4 is secured beneath the same and mounted upon the standard 12. This collar may be normally supported in a raised position to open the mold by means of a compressible spring 3, encircling the upright 12, and assisted, if desired, by a lever 6, fulcrumed upon a post 9, supported from a lug 32 upon the floor-plate and provided at its outer end with an adjustable weight 33, by means of which the force used to open the mold may be adjusted. It will be apparent that under some conditions both the spring and weighted lever are not necessary, and therefore either may be used without the other, as found desirable. For the purpose of closing the mold a lever 5 is pivotally connected to the collar 4 at 31 and supported at one end 5' upon a post 10, mounted in a lug 32' upon the base-plate 1, while the free end of this closing-lever is pivotally connected to a rod 28 at the point 28', the opposite end of the rod being provided with a foot-treadle 29, disposed above a platform or support 30.

In the operation of the invention, which is intended for use with blown-glass articles, such as sign-letters, it will be seen that the mold is closed upon the material to be molded by depressing the treadle 29 and carrying downward the flanged plate, so as to mold the article by contact with the dies carried by the sections of the mold, which sections may be varied to suit any desired character of work. As the mold is particularly designed for operation in connection with articles having a right or other angle edge which is liable to be chipped and broken if the mold-sections oscillate directly therefrom, provision has been made herein to first slide or reciprocate the mold-sections from the position shown in Fig. 1 to that shown in Fig. 3. When the parts are in the position shown in Fig. 1, the tooth upon the operating-lever is out of engagement with the crotch upon the yoke and the preliminary reciprocating motion is imparted by the curved head of the lever until the parts reach the position shown in Fig. 3, when the tooth engages the crotch and bodily lifts the section of the mold by an oscillating motion into the position shown in Fig. 4, thus permitting ample space for the removal and insertion of the molded material. In the closing of the mold this operation is repeated in a reverse order. It will further be observed that by providing an air-space between the yokes and sections of the mold the heating of the former is avoided, while the ears at opposite sides of the yoke provide a guide for the sliding and reciprocating motion thereof and prevent any lateral play or disarrangement of the parts. Furthermore, the flanged plate coöperating with the levers provides means for conveniently operating the same, and the whole device forms a simple and economically-constructed apparatus by which the most efficient molding operation can be secured and a device in which the parts can be easily removed and replaced when desired.

It will be obvious that changes may be made in the details of construction and configuration without departing from the spirit of the invention as defined by the appended claims.

Having described my invention and set forth its merits, what I claim, and desire to secure by Letters Patent, is—

1. In a molding apparatus, the combination with mold-sections, of means for imparting a preliminary reciprocating movement thereto, and means for providing a subsequent oscillating movement thereto; substantially as specified.

2. In a molding apparatus, the combination with mold-sections, of means for imparting a preliminary reciprocating movement thereto, means for providing a subsequent oscillating movement thereto, and means for automatically controlling the opening movement of the mold-sections; substantially as specified.

3. In a molding apparatus, the combination with mold-sections, of yokes secured thereto, pivoted levers coöperating with said yokes and having free ends disposed in a horizontal plane, a sliding flanged plate adapted to embrace the free ends of said levers to permit reciprocation of the same between the flanges of the plate, and means for reciprocating said plate; substantially as specified.

4. In a molding apparatus, the combination with mold-sections, of yokes secured thereto, pivoted levers coöperating with said yokes, a sliding plate adapted to engage the ends of said levers to operate the same, means for reciprocating said plate, and a spacing-lug between said yokes and mold-sections to provide an air-space; substantially as specified.

5. In a molding apparatus, the combination with mold-sections, of yokes secured thereto, pivoted levers coöperating with said yokes, a sliding plate adapted to engage the ends of said levers to operate the same, means for reciprocating said plate, a spacing-lug between said yokes and mold-sections to provide an air-space, and pivoting-ears for said levers disposed on opposite sides of each of said yokes; substantially as specified.

6. In a molding apparatus, the combination with mold-sections, of yokes secured thereto, pivoted levers coöperating with said yokes, a sliding plate adapted to engage the ends of said levers to operate the same, means for reciprocating said plate, a spacing-lug between said yokes and mold-sections to provide an air-space, pivoting-ears for said levers disposed at opposite sides of each of said yokes, a lever for depressing said sliding plate, and means for automatically raising said plate; substantially as specified.

7. In a molding apparatus, the combination with a mold-section, of a yoke carried thereby provided with a circular recess and a crotch at one side thereof, a pivoted operating-lever having a circular head and tooth to engage said recess and crotch respectively, and means for operating said lever; substantially as specified.

8. In a molding apparatus, the combination with a mold-section, of a lug carried thereby provided with a circular recess and crotch at one side thereof, a pivoted operating-lever having a circular head and tooth to engage said recess and crotch respectively, a reciprocating flanged plate to engage the free end of said lever, and means for reciprocating said plate; substantially as specified.

9. In a molding apparatus, a base-plate, an upright extending therefrom, a mold base-plate at the upper end of said upright, pivoting-ears extended from the edges of said base-plate, mold-sections provided with dies, yokes carried by said sections and disposed between said ears, and operating-levers for said yokes pivoted in said ears and provided with means for imparting a reciprocating and oscillating movement to the yokes; substantially as specified.

10. In a molding apparatus, a base-plate, an upright extending therefrom, a mold base-plate at the upper end of said upright, pivoting-ears extended from the edges of said base-plate, mold-sections provided with dies, yokes carried by said sections and disposed between said ears, operating-levers for said yokes pivoted in said ears and provided with means for imparting a reciprocating and oscillating movement to the yokes, a flanged plate slidingly mounted upon said upright and provided with a depending collar, bearing-wheels upon the free ends of said levers disposed between the flanges of said plate, and means for reciprocating said plate; substantially as specified.

11. In a molding apparatus, a base-plate, an upright extending therefrom, a mold base-plate at the upper end of said upright, pivoting-ears extended from the edges of said base-plate, mold-sections provided with dies, yokes carried by said sections and disposed between said ears, operating-levers for said yokes pivoted in said ears and provided with means for imparting a reciprocating and oscillating movement to the yokes, a flanged plate slidingly mounted upon said upright and provided with a depending collar, bearing-wheels upon the free ends of said levers disposed between the flanges of said plate, a coiled spring extending between said collar and base for lifting said plate, and a lever pivoted at one end to a post from said base and connected to said collar for depressing the same; substantially as specified.

12. In a molding apparatus, a base-plate, an upright extending therefrom, a mold base-plate at the upper end of said upright, pivoting-ears extended from the edges of said base-plate, mold-sections provided with dies, yokes carried by said sections and disposed between said ears, operating-levers for said yokes pivoted in said ears and provided with means for imparting a reciprocating and oscillating movement to the yokes, a flanged plate slidingly mounted upon said upright and provided with a depending collar, bearing-wheels upon the free ends of said levers disposed between the flanges of said plate, a coiled spring extending between said collar and base for lifting said plate, a lever pivoted at one end to a post from said base and connected to said collar for depressing the same, and a weighted lever pivotally mounted upon another post from said base and connected at one end with said collar for lifting said flanged plate; substantially as specified.

13. In a molding apparatus, a base-plate, an upright extending therefrom, a mold base-plate at the upper end of said upright, pivoting-ears extended from the edges of said base-plate, mold-sections provided with dies, yokes carried by said sections and disposed between said ears, operating-levers for said yokes pivoted in said ears and provided with means for imparting a reciprocating and oscillating movement to the yokes, a flanged plate slidingly mounted upon said upright and provided with a depending collar, bearing-wheels upon the free ends of said levers disposed between the flanges of said plate, a coiled spring extending between said collar and base for lifting said plate, a lever pivoted at one end to a post from said base and connected to said collar for depressing the same, a weighted lever pivotally mounted upon another post from said base and connected at one end with said collar for lifting said flanged plate, and spacing-lugs between said yokes and mold-sections to provide an air-space; substantially as specified.

14. In a molding apparatus, a mold-section, a yoke carried thereby provided with a curved recess and a crotch at one side thereof, a pivoted operating-lever having a curved head to fit said recess and a tooth at one side of said head normally out of engagement with said crotch when the mold is closed and adapted to engage the crotch after the preliminary opening movement of the mold, and means for operating said lever; substantially as specified.

In testimony whereof I affix my signature in presence of two witnesses.

CHARLES E. HANCOCK.

Witnesses:
T. C. RUBLE,
CHAS. P. BRUNT.